United States Patent [19]

Durand

[11] Patent Number: 5,164,134
[45] Date of Patent: Nov. 17, 1992

[54] PROCESS FOR MANUFACTURING A SEALING RING FOR PACKAGING

[75] Inventor: Philippe Durand, Arques, France

[73] Assignee: Verrerie Cristallerie D'Arques J. G. Durand & Cie Sarl, Arques Pas-de-Calais, France

[21] Appl. No.: 646,470

[22] Filed: Jan. 25, 1991

Related U.S. Application Data

[62] Division of Ser. No. 291,672, Dec. 29, 1988, abandoned.

[30] Foreign Application Priority Data

Dec. 29, 1987 [FR] France ................. 87 18535

[51] Int. Cl.⁵ .............. B28B 07/16; B29C 45/04
[52] U.S. Cl. ..................... 264/154; 264/294; 264/296; 264/328.7; 264/328.14
[58] Field of Search ............ 264/296, 294, 154, 328.7, 264/328.14, 328.11

[56] References Cited

U.S. PATENT DOCUMENTS

| | | | |
|---|---|---|---|
| 793,525 | 5/1905 | Hill | 215/262 |
| 1,733,322 | 10/1929 | Thebaud | 215/262 |
| 2,187,395 | 1/1940 | Glocker | 215/262 X |
| 2,437,515 | 3/1948 | Glocker | 215/262 |
| 3,996,329 | 12/1976 | Holland et al. | 264/296 |
| 4,142,645 | 3/1979 | Walton | 215/262 X |
| 4,778,072 | 10/1988 | Newman | 215/262 X |

FOREIGN PATENT DOCUMENTS

| | | | |
|---|---|---|---|
| 828773 | 9/1975 | Belgium . | |
| 323935 | 5/1918 | Fed. Rep. of Germany | 215/262 |
| 89641 | 1/1922 | Fed. Rep. of Germany | 215/262 |
| 560843 | 8/1931 | Fed. Rep. of Germany | 215/341 |
| 812501 | 7/1951 | Fed. Rep. of Germany . | |
| 897509 | 10/1953 | Fed. Rep. of Germany | 215/262 |
| 0620292 | 4/1927 | France | 215/352 |
| 2543056 | 9/1984 | France . | |
| 2587002 | 3/1987 | France . | |
| 501300 | 11/1954 | Italy | 215/262 |
| 171622 | 11/1921 | United Kingdom | 215/262 |
| 613828 | 12/1948 | United Kingdom | 215/262 |

OTHER PUBLICATIONS

European Search Report–EP 88 40 3256.

*Primary Examiner*—Jeffery Thurlow
*Assistant Examiner*—A. Y. Ortiz
*Attorney, Agent, or Firm*—Sandler, Greenblum, & Bernstein

[57] ABSTRACT

Packaging means such as a bottle, jar or other receptacle, having a sealing ring, as well as a process for manufacturing such a seal. These packaging means include containers especially of the type to be kept in stock and/or stored. The packaging means include at least a container and a lid, between which is arranged a sealing ring defining an internal space in relation to the outside of the packaging means, with the packaging means being capable of containing a product or any other substance whatsoever under conditions of vacuum or partial vacuum. The sealing ring includes means for bringing about communication between the internal space and the outside of packaging means, being blocked while the vacuum is being brought about and/or maintained and capable of being unblocked in order to facilitate opening the packaging means.

6 Claims, 2 Drawing Sheets

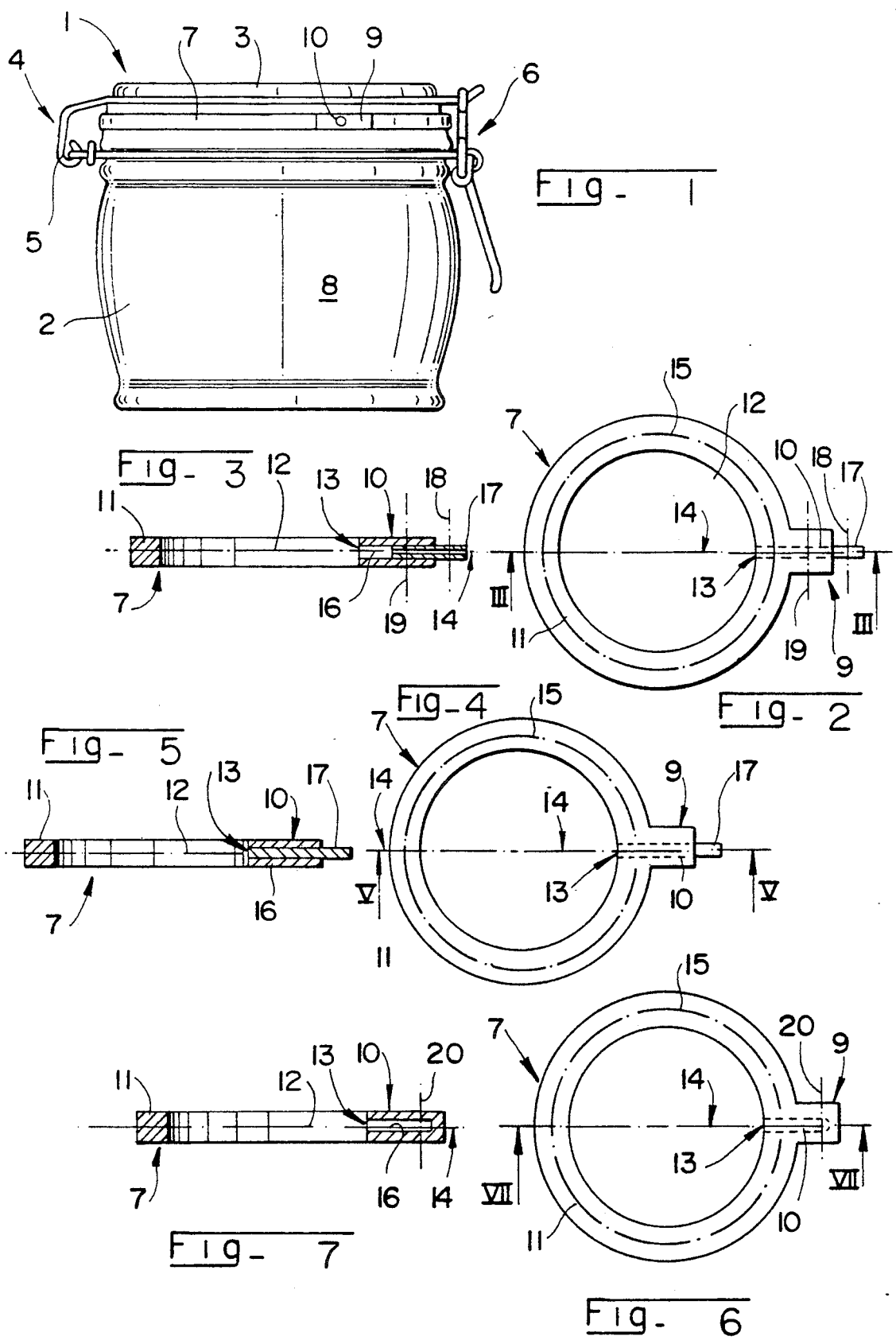

PROCESS FOR MANUFACTURING A SEALING RING FOR PACKAGING

This application is a division of application Ser. No. 07/291,672, filed Dec. 29, 1988 now abandoned.

BACKGROUND OF THE INVENTION

The invention relates to a packaging means such as a bottle, jar or other similar receptacle and to a sealing ring for said packaging means as well as to a process for manufacturing said sealing ring.

The invention will, in particular, find application in the sphere of manufacturing containing devices for the storage or transportation of objects, products, materials or any substances whatsoever as well as in the sphere of manufacturing sealing rings for such devices.

Furthermore, it will be used in various spheres where it is necessary to preserve products or any substances whatsoever under conditions of vacuum or partial vacuum. One of the principal non-limiting applications is to be found in the alimentary sphere. However, other applications might be envisaged, for instance in the medical sphere.

It has, in fact, been known long since in the alimentary sphere for producing preserves with the aid of packaging means such as bottles, jars or other similar receptacles consisting generally in a container of appropriate form and, inter alia, an articulated lid which is locked by means of a closure system.

Furthermore, it is usual to provide, between the container and the lid, a sealing ring which has two functions. In fact, it fulfils a first function when preparing preserves as such and a second function when the preserve has been opened, with a view to its subsequent preservation.

The seals currently available in commerce are produced by extruding pure natural rubber or filled rubber in a die with a tube corresponding to the profile of the seal. Accordingly, a tubular body is formed, which is then cut according to the required thickness of the seal.

This being the case, the full packaging means is generally sterilized, in order to produce such preserves. This sterilization entails virtually total evacuation of the air remaining within the packaging means, and once the latter has been refrigerated, the lid is firmly applied to the container as a result of the atmospheric pressure.

During the sterilization process, vapour is, in fact, produced inside said packaging means, which, during this phase, is evacuated from the packaging means while entraining the residual air. At the moment of refrigeration, the sealing ring and the closure system prevent the outer ambient air or liquid from returning into the receptacle while the vapour contained in the inner space condenses. One is then faced with an internal pressure inside the packaging means equal to the pressure of saturating vapour at ambient temperature.

This internal pressure can decline to a value of several mm Hg until it is very much lower than the atmospheric pressure. Hence, bearing in mind the dimensions of the packaging means, it is not rare to find that stresses of the order of 50 kg are applied to the sealing ring, these stresses being brought about by the negative pressure prevailing in relation to the ambient air within the packaging means.

The problem is therefore to overcome this force acting upon the seal in order to open the packaging means with a view, for example, of consuming the product contained inside.

To this end it should be noted that after sterilization and refrigeration the closure system can be released without at the same time causing the packaging means to be opened, since the lid is pressed against the container owing to the negative pressure inside.

In order to enable such opening, sealing rings are generally provided with a lug projecting to the outside of said packaging means. This lug can then be gripped and pulled firmly so as to pull the seal towards the outside and thus bring about an abrupt entry of air into the packaging means, with a view to enabling it to be opened.

However, it should also be noted that, in order to carry out this operation, it is necessary to exert a traction force on the lug, which is such that certain users do not manage to open the packaging means and, on occasion, even damage or tear the seal.

In order to alleviate the latter disadvantage, such packaging means have been perfected as regards the system for closing and locking the lid on the container.

In fact, metal wire fittings are known which, on the one hand, surround the body of the container, and, on the other hand, the lid, thus enabling articulation and locking of the two components.

Incidentally, said fitting has at the level of the locking system a closing lever so constructed as to enable it to exert, with the aid of a lever arm, a force on the lid during the opening operation, the purpose being to reduce the manual force required.

Nevertheless, one keeps coming across certain people who do not manage to open the packaging means with the aid of this system, and on occasion the negative pressure within the inner space is such that one causes the lever arm to be bent during the unlocking operation.

In order to facilitate opening of such packaging means, one has, more recently, designed a sealing ring with two separate external lugs separated, at the level of the sealing band, by a zone of lower strength.

Opening of the packaging means is enabled after unlocking the lid by simultaneously pulling at the two lugs, so as to separate one from the other in order to try and tear the seal at the level of its low-strength zone.

However, if the operator happens to tear said seal, it should be noted that the packaging means is in danger of being opened abruptly, so that the operator, having both his hands occupied, no longer controls said packaging means, not without giving rise to certain problems.

Furthermore, the seal having been torn can no longer be used for subsequent preservation of the product after opening.

In short, all these opening techniques entail disadvantages, for in many cases they work imperfectly, require considerable force for opening, frequently make the sealing ring unsuitable for further use, and depend equally on the quality and aging of the material of which the seal is substantially made.

SUMMARY OF THE INVENTION

The present invention is intended to provide a packaging means such as a bottle, jar or other receptacle, capable of containing a product or any other substace under conditions of vacuum or partial vacuum, as well as a sealing ring for said packaging means, making it possible to alleviate these different disadvantages and enabling very easy opening of the packaging means as well as reuse of the seal with a view to subsequently using the packaging means after it has been opened.

Another object of the present invention consists in providing a packaging means capable of containing a product or any substance whatsoever under conditions of vacuum or partial vacuum, as well as a sealing ring for said packaging means, which are designed simply while offering major advantages in use, without this, however, reflecting to a significant extent on the resale cost of said packaging means.

Another object of the present invention consists in providing a packaging means such that, thanks to its sealing ring, the operator is required to apply a very minimal force in order to break the vacuum inside the packaging means and enable it to be opened.

Another object of the present invention consists in providing a process for manufacturing a sealing ring designed for such a packaging means, which enables the production of the seal on an industrial scale, that is to say at high rates and without major excess cost.

As far as that goes, one object of the present invention consists in providing a moulding process requiring specific stages in relation to the injection method and with the known techniques, in order to be able to achieve a perfectly efficient seal without supplementary finishing or reducing the production rate.

Other aims and advantages of the present invention will emerge in the course of the following specification, which, however, is offered only by way of example and is not intended to limit said invention.

According to the present invention, the packaging means such as a bottle, jar or other receptacle, comprising at least a container and a lid between which is located a sealing ring, defining an internal space in relation to the outside of said packaging means, capable of containing a product or any substance whatsoever under conditions of vacuum or partial vacuum, said seal consisting in a band of, in particular compressible, material, while defining a closed seal plane at the level of the mouth of the container, is characterized by the fact that the sealing ring is provided with means for causing said inner space and the outside of the packaging means to communicate, said means being blocked while producing and/or maintaining the vacuum, capable of being unblocked in order to facilitate opening of said packaging means, comprising at least one orifice, blocked and/or capable of being blocked, which is provided within the plane of the seal, its axis intersecting the wall of the container, said orifice being accessible from outside said packaging means so as to enable it to be unblocked.

Furthermore, the invention proposes a sealing ring which will be applied, in particular, to a packaging means such as defined above, consisting in a band of material, in particular compressible material, defining a closed seal plane, which is characterized by the fact that it has at least one orifice, blocked and/or capable of being blocked, arranged within its thickness, the axis of which intersects the longitudinal axis of the band, opening out laterally at least on one side of the band and accessible laterally so as to enable it to be unblocked.

According to the present invention, said orifice has, in addition means of internal reinforcement in order to prevent the inner space of said orifice from being blocked as a result of seal compression, during the phase in which the vacuum is created and/or maintained.

This being the case, the structure of the sealing ring according to the present invention does not permit of it being manufactured by extrusion. For this reason one of the aims of the present invention is to provide a process for manufacturing such a seal by injecting "mouldable" material into a mould shaped in accordance with said seal.

In this connection, the expert knows different techniques and would think either of bringing about the duct by the addition of a different material or by providing, within the structure of the mould itself, a core forming said means for bringing about communication.

However, such a technique is not entirely satisfactory, for, on the one hand, this involves supplementary finishing and, on the other hand, the seals produced are not of sufficient quality to be effective.

In fact, tests carried out in this respect have resulted in sealing rings in which the material is distributed in a non-uniform manner and in which said communication orifice is of poor conformation.

For this reason a specific manufacturing process has been perfected, in which the seal is produced by the injection of natural or synthetic rubber or of thermoplastic material into a mould of appropriate shape, by which said orifice, blocked and/or capable of being blocked, is brought about within the material itself of the seal by means of a retractable pin in said mould, during the moulding phase.

BRIEF DESCRIPTION OF DRAWINGS

The present invention will be understood better from reading the following specification accompanied by the drawings which are an integral part thereof.

FIG. 1 is a profile view of a packaging means according to one form of implementation of the present invention.

FIG. 2 is a view from above of a first form of implementation of the sealing ring according to the present invention suitable for equipping, for example, a packaging means such as shown in FIG. 1.

FIG. 3 shows a sectional view of the seal presented in FIG. 2 along the axis III—III.

FIG. 4 shows a view from above of a second mode of implementation of the sealing ring according to the present invention.

FIG. 5 shows a sectional view of the sealing ring presented in FIG. 4 along the axis V—V.

FIG. 6 shows another mode of implementation of the sealing ring according to the present invention as seen from above.

FIG. 7 shows a sectional view of the seal presented in FIG. 6 along the axis VII—VII.

DETAILED DESCRIPTION OF THE INVENTION

Figure 8A:
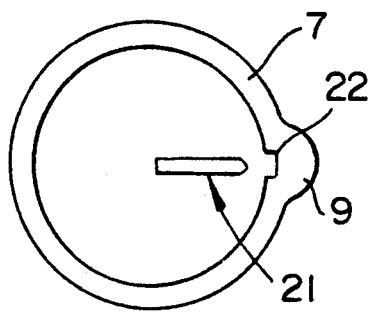
FIG. 8a to 8c show different specific stages of the process of manufacturing the seal according to the present invention.

The invention relates to a packaging means such as a bottle, a jar or another receptacle and a sealing ring for such a packaging means as well as to a process for manufacturing said sealing ring.

More precisely, said packaging means is, according to the invention, intended to contain a product or any substance whatsoever under conditions of vacuum or partial vacuum, with a view, for example, to preserving said product or substance.

A first application of such a packaging means in the alimentary sphere will enable the invention to be applied to domestic and industrial articles for preservation.

However, it will be possible to apply the invention in any other sphere in which it is necessary to preserve any product, object, material or substance whatsoever under conditions of vacuum or partial vacuum, with a view to its transportation or storage.

Such packaging means are known, and, by way of example, FIG. 1 illustrates one of them, which according to its structure constitutes a jar. Nevertheless, it would be possible to envisage different types.

Packaging means 1 comprises in substance a container 2, which, in the present case, consists in the body of the jar, and a lid 3 suitable for closing said container.

Furthermore, such packaging means may be provided with a metal fitting 4 presenting both an articulation system 5 for lid 3 on container 2 and a closure system 6 with a yoke and lever, enabling in particular locking of the lid on the container.

Such metallic fittings are known to the expert and will not therefore be described in greater detail in the present application. Its essential function consists in retaining the lid on the container, for instance during the sterilization phase.

Incidentally, with the packaging means known so far, such a fitting also facilitates opening of the packaging means according to the principle mentioned above. However, it should be noted that thanks to the structure of the present invention, this second function is no longer utilised, and it is possible to envisage the utilisation of other closure systems, the required function of which consists in application of the lid to the container during the sterilization phase.

Furthermore, with a view to bringing about tightness between lid 3 and container 2, a seal 7 is provided at the level of the upper edge of the wall of container 2, in order to define, when lid 3 is placed on said container, an internal space 8 in relation to the outside of said packaging means 1.

So far the characteristics described above have been known for a long time, use being made of such jars, in particular glass jars, in order to produce domestic, industrial or other preserves.

Furthermore, with such packaging means, a lug 9 is provided at the level of the periphery of sealing ring 7, which facilitates, in particular, the operations of opening the packaging means after the ambient air has been evacuated or at least partly evacuated from its internal space.

It should be noted that this arrangement of a lug is in fact traditional with the known sealing rings; however, according to the present invention, it would be quite possible to envisage the production of such a seal without lug.

This being the case, sealing ring 7 is, according to the present invention, provided with means 10 for bringing about communication between said internal space 8 and the outside of packaging means 1.

These means 10 will be blocked in the course of producing the vacuum, for example during the phase of sterilisation. They will also be blocked during storage of the packaging means while maintaining the vacuum.

However, they will be capable of being unblocked in order to facilitate opening said packaging means in order to enable the operator to gain access to internal space 8 with a view to recovering the product, material or substance contained within said preserve.

The different FIGS. 2 to 7 show several modes of implementation of sealing ring 7 according to the present invention.

With all these modes of implementation, seal 7 is adapted to the configuration of the mouth of container 2 of packaging means 1, which, in the present case, has a circular profile.

Seal 7 consists in a band 11 of, in particular, compressible material, the longitudinal axis 15 of which corresponds substantially to the mouth of container 2 inasmuch as it defines a closed seal plane 12.

According to the mode of implementation described in the present application, said means 10 for bringing about communication between said internal space 8 and the outside of packaging means 1 consists in at least one orifice 13 arranged within the plane of the seal and provided within the thickness of band 11, axis 14 thereof intersecting the wall of the container, as shown in diagrammatic form by the dashdot line 15 in FIGS. 2, 4 and 6, corresponding substantially to the longitudinal axis of said band.

Furthermore, this orifice 13 is blocked and/or capable of being blocked and accessible from the outside of said packaging means 1 so as to enable it to be unblocked. In addition, it opens out laterally on at least one side of the band and is accessible laterally so as to enable it to be unblocked.

This being the case, said orifice 13 also comprises means of internal reinforcement in order to prevent the internal space of said orifice 13, that is to say the cavity formed in band 11 by said orifice 13, from being blocked as a result of seal compression during the phase in which the vacuum is brought about and/or maintained.

In fact, if this were the case, it would then be impossible to cause the inside of the packaging means to communicate with the external atmosphere.

FIGS. 2 to 5 show two first modes of implementation, in which said orifice 13 is designed as a duct 16 of reduced dimensions, defined within thickness 11 of the seal, opening out from the side of inner space 8 of the packaging means, that is to say towards the inside of the seal, and opening out also towards the outside of said packaging means, that is to say towards the outside of the seal.

Furthermore, for blocking said orifice 13, a blocking element 17 is provided, of a form suitable for said duct 16 and located within the latter.

In order to enable access to said orifice 13 from the outside of said packaging means 11 and in order to enable it, in particular, to be unblocked, said blocking element 17 is such as to project from the sealing ring to the outside of the packaging means, so as to enable it to be gripped by the operator when the latter endeavours to cause said internal space 8 to communicate with the outside of packaging means 1.

With the mode of implementation shown in FIGS. 2 and 3, said blocking element 17 consists substantially in a tubular element, one of the ends of which is closed, thus blocking said orifice 13.

When the operator wishes to open the packaging means, it will be sufficient for him to break the seal at the level of the closed part of element 17 projecting from the seal. It would for instance be possible to envisage production of such a tubular blocking element 17 in the form of an element of synthetic material, capable of being cut with scissors.

Furthermore, it will be possible to provide the assembly duct 16 and blocking element 17 at the level of said lug 9 in order to make it easier to locate said means 10 for bringing about communication.

Hence the operator wishing to open such a packaging means will be able, after unlocking lid 3 and container 2, to cut either the end of element 17 along the reference cutting axis 18 or the assembly lug and blocking element along the reference axis 19 in FIGS. 2 and 3.

With the mode of implementation shown in FIGS. 4 and 5, said blocking element 17 consists in a thread-shaped solid element, the dimensions of which are adapted to duct 16.

In the same way as in the preceding case, this blocking element 17 projects slightly from the sealing ring towards the outside of the packaging means, so that it can be gripped, for instance, between thumb and index finger, in order to exert a pull on said blocking element and unblocking orifice 13.

Such a mode of implementation may enable reuse of the sealing ring for a subsequent phase of sterilization, by replacing, after use, blocking element 17 in duct 16.

It should be noted that with the two preceding modes of implementation, said internal means of reinforcement provided in order to prevent the internal space of said orifice 13 from being blocked during compression of the seal, consists substantially in said blocking element 17.

However, such a mode of implementation necessitates the use of an additional component, which entails additional cost and complementary finishing of the seal.

It is also possible to envisage another mode of implementation such as illustrated in FIGS. 6 and 7.

In this case, said orifice 13 is designed as a duct with reduced dimensions 16, also defined within the thickness 11 of the seal, but in the form of a blind hole, thus substantially constituting the blockage. Furthermore, this arrangement must be such that said blind duct 16 is capable of being unblocked from the outside of said packaging means.

In the case shown in FIGS. 6 and 7, duct 16 is arranged at the level of lug 9 of the seal and opens out into said internal space 8, that is to say towards the inside of the seal.

Given the fact that orifice 13 is located within the lug, the latter advantageously constitutes a point of reference visible from the outside of the packaging means, so that the user can locate said orifice, enabling it to be unblocked at the moment at which the packaging means is opened.

To this end, said unblocking operation can, in particular, be carried out by cutting the lug along axis 20 shown in FIGS. 6 and 7.

However, although said lug 9 provided at the periphery of the seal and projecting towards the outside of said packaging means 1 is of interest, it would also be possible to provide means 10 for bringing about communication according to the present invention in a seal without any lug.

Hence, for locating said orifice 13 and enabling it to be unblocked, said seal 7 will exhibit some reference mark visible from the outside of the packaging means, which can be seen by the operator.

It would, for example, be possible to envisage a coloured reference mark provided at the level of said orifice, whereby the operator perforates the band of the seal at that level in order to unblock duct 16.

With this mode of implementation, said means for internal reinforcement of orifice 13 consists substantially in a special profile of duct 16, such as a polygonal profile, for instance a triangle, square, parallelogram, rhomboid, semicircle or circle segment.

Figure 10A:
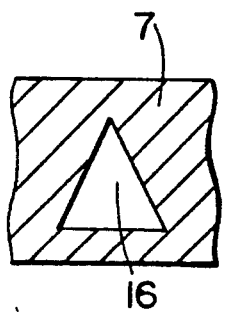
FIGS. 10a to 10c shows different implementations of the seal, along the axis X—X in FIG. 9, and, more precisely, different possible profiles of the communication duct.
Figure 10B:
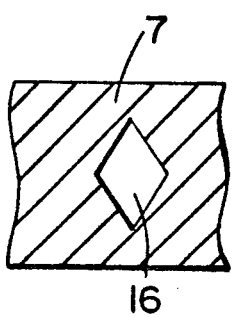
Figure 10C:
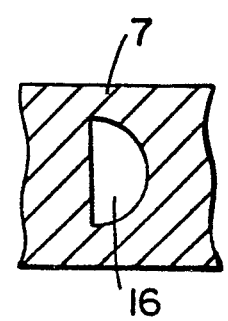

In this connection, FIGS. 10a to 10c show three manners of implementation, i.e. a triangle, a rhomboid and a semicircle with a diameter in the direction of the thickness of the joint, respectively, which have yielded good results and enable, in spite of the pressure exerted by the lid on the seal and caused by the presence of a vacuum inside the packaging means, a duct to remain unblocked throughout the width of the seal.

As regards the structure itself of sealing ring 7 according to the present invention, the latter will advantageously be produced of any compressible material such as rubber for alimentary applications or from any other synthetic or composite material.

By way of example, good results have been achieved by using elastomeric thermoplastic materials such as, in particular materials based on styrene, ethylene and butylene styrene.

The advantage of such an implementation will consist in the possibility of, for instance, cutting the seal by means of scissors, by piercing with the aid of pins, or simply by tearing.

As for the dimensions of said orifice 13, 16, these will be decided by the expert in accordance with the dimensions of the seal and the pressure exerted by the lid on the container. Furthermore, it will also be possible to envisage, in certain special cases, the use of ducts having other cross-sections than polygonal ones, for instance circular or elliptical cross-sections.

Furthermore, the material of the seal or/and its dimensions or/and the shape of the orifice will be decided in accordance with the application and dimensions of the container, in order to prevent the internal space of the duct, as specified above, from being totally blocked when seal 7 is compressed between lid 3 and container 2, as a result of a negative pressure being created within internal space 8.

However, this duct will, of course, have a reduced cross-section when the seal is subject to pressure, and this will give rise, at the moment at which the orifice for bringing about communication between the internal space and the outside is unblocked to a limited initial intake of air in order to avoid an excessively abrupt opening.

Figure 8B:
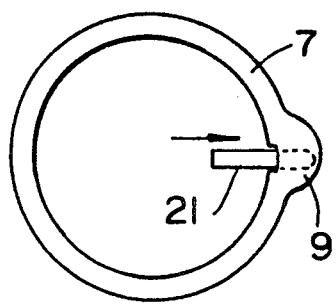
Figure 8C:
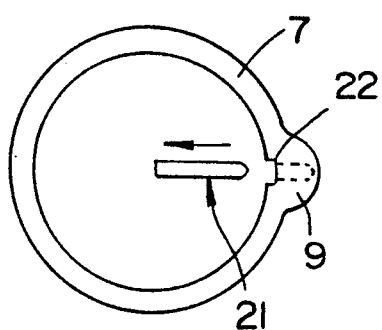
Figure 9:
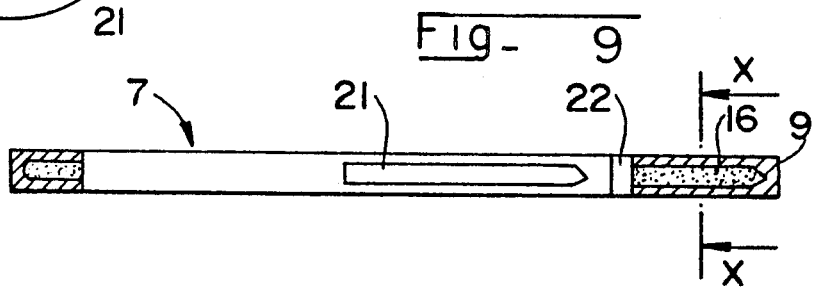
FIG. 9 shows a sectional view of the seal in the course of manufacturing.

FIGS. 8 and 9 show a mode of implementation similar to that in FIGS. 6 and 7. However, it will be noted that a supplementary recess 22 is provided along the extension of duct 16, towards the inside of the container, intended to enable communication between the internal volume and the outside of the packaging means, which is necessary in certain cases if the inner surface of seal 7 is in direct contact with a lateral stop provided within the lid in order to maintain said seal in position.

The structures of the sealing ring such as specified above prevent its production by extrusion through a die followed by cutting, since said orifice 13, blocked and/or capable of being blocked, in the material itself of the seal, cannot be produced by such a process.

However, it is necessary to produce such a sealing ring industrially, that is to say at high rates of output without significantly increasing the resale price.

This has led to the production of the sealing ring by injecting "mouldable" material into a mould of a form suitable for said seal while providing a core within the plane of the rubber band so as to give rise to said orifice 13.

Such a method is known to the expert but has not proved satisfactory. In fact, it has been found that during injection of the material into the mould major disturbances in the flow of the material have caused the latter to become non-homogeneous, which is disadvantageous for its application as a sealing ring.

Furthermore, the fixed core provided within the mould with a view to forming said orifice entailed numerous thermal and mechanical problems.

In fact, bearing in mind the necessary thinness of said core, the latter heated up excessively and was subject to excessive mechanical stresses due to the flow of the material.

For this reason a specific process has been devised for producing the seal in accordance with the present invention.

The process according to the present invention consists in producing the seal by injecting material into a mould of suitable design and said orifice 13, blocked and/or capable of being blocked is produced in the material itself of the seal by means of a rod or pin 21 which can, during the moulding phase, be retracted within said mould.

In this respect, FIGS. 8a to 8c and 9 illustrate certain important phases of the manufacturing process.

These phases may summarized in the following manner:

The material to be moulded is injected into the mould, said rod or pin 21 being retracted, as shown, in particular, in FIG. 8a.

Once the material has filled the mould completely, said rod or pin 21 is introduced abruptly through the inside of the seal, as shown in FIG. 8b.

Said rod or pin is maintained within the thickness of seal 7 during the entire curing time of the material.

Said rod or pin 21 is retracted, immediately prior to removal from the mould, as shown in FIG. 8c.

This method of production enables, on the one hand, sparing use of the rod or pin, which is no longer subject to excessive overheating or excessive mechanical stresses due to the flow of material in the course of injection. On the contrary, a chilled pin is introduced into the hot fluid material, thus promoting the formation of the inner periphery of the duct.

In fact, when filling a mould, the material in contact with the metal of the mould tends to solidify rapidly, thus making it possible to achieve a correct state at the surface.

However, if the material solidifies as it comes into contact with the metal of the mould, said material remains fluid longer at the core of the material, as indicated by the small dots in FIG. 9.

According to the present invention, use is made of this structure in order to guide the rod or pin, thanks to the solidification of the upper and lower faces of seal 7 in contact with the metal of the mould. Incidentally, the end of this rod or pin will be designed in such a way as to promote the guiding phenomenon.

It should be noted that these operations of forming the duct do not involve lengthening the injection cycle times, since, in general, the injection of such material always calls for products subject to relatively long cycles owing to the material curing time directly after filling the mould. Hence, one takes advantage of this delay in order to produce said duct.

So as to achieve duct profiles suitable as the said internal means of reinforcement, the shape of the rod or pin 21 will be adapted to the shape of the required orifice, for instance, as shown in FIGS. 10a to 10c.

It stands to reason that other implementations of the present invention, within reach of an expert, could be envisaged, without, however, going beyond the scope of the latter.

I claim:

1. Process for manufacturing a joint for packaging, the joint being in the form of a sealing ring defining a seal plane and being composed of a compressible material, a communication opening comprising a blind duct having a reduced diameter positioned in the sealing ring, extending within the sealing plane, and laterally exiting from at least one side of the sealing ring, the process comprising:
    injecting a compressible moldable material into a mold having the shape of the sealing ring;
    permitting upper and lower surfaces of the sealing ring to solidify in contact with the mold;
    inserting a pin into the sealing ring to form the blind duct, with the pin being guided by solidification of the upper and lower surfaces of the sealing ring;
    maintaining the pin in the sealing ring during a time that the compressible moldable material sets completely; and
    removing the pin from the sealing ring prior to removing the sealing ring from the mold.

2. The process according to claim 1, wherein the step of inserting the pin is performed from a retracted position of the pin upon complete filling of the mold.

3. The process according to claim 1, wherein the pin is cooled prior to the step of inserting the pin.

4. The process according to claim 3, wherein cooling of the pin comprises chilling the pin.

5. The process according to claim 1, wherein the pin has a polygonal conduit profile.

6. The process according to claim 5, wherein said polygonal conduit profile comprises a member selected from the group consisting of a parallelogram, rhomboid, square, triangle, and semi-circular segment.

* * * * *